United States Patent
Radle

[11] Patent Number: 6,116,095
[45] Date of Patent: Sep. 12, 2000

[54] APPARATUS AND METHOD FOR MEASURING AIR FLOW FROM A DUCT SYSTEM

[75] Inventor: David T. Radle, LaGrange, Ind.

[73] Assignee: White Consolidated Industries, Inc., Cleveland, Ohio

[21] Appl. No.: 09/188,641

[22] Filed: Nov. 9, 1998

[51] Int. Cl.[7] .................... G01F 1/86; G01F 7/00; B60H 1/32

[52] U.S. Cl. ............ 73/861.01; 72/195; 72/197; 72/756; 62/244

[58] Field of Search ............ 73/863.02, 863.11, 73/863.03, 756, 861.62, 861.65, 861.53, 861.01, 195; 62/244; 181/185, 186, 224, 226

[56] References Cited

U.S. PATENT DOCUMENTS

| | | | |
|---|---|---|---|
| 3,733,900 | 5/1973 | De Baun | 73/212 |
| 3,855,814 | 12/1974 | Eubank | 62/244 |
| 4,517,826 | 5/1985 | Cole et al. | 73/40 |
| 4,552,059 | 11/1985 | Potter | 98/115.1 |
| 4,570,493 | 2/1986 | Leemhuis | 73/861.62 |
| 4,641,502 | 2/1987 | Aldrich et al. | 62/244 |
| 4,709,623 | 12/1987 | Roth et al. | 98/40.05 |
| 4,836,095 | 6/1989 | Wright, Jr. | 98/31.6 |
| 4,993,269 | 2/1991 | Guillaume et al. | 73/861.53 |
| 5,426,975 | 6/1995 | Stark | 73/202 |
| 5,531,641 | 7/1996 | Aldrich | 454/100 |
| 5,892,160 | 4/1999 | Hall | 73/863.03 |

Primary Examiner—Benjamin R. Fuller
Assistant Examiner—Abdullahi Aw-Musse
Attorney, Agent, or Firm—Pearne, Gordon, McCoy & Granger LLP

[57] ABSTRACT

A method and apparatus for selectively predicting the air flows from a duct system that would be produced by environment conditioning plants. The apparatus includes a measurement duct connected to a blower. A restrictor plate is movably mounted over an inlet to the blower to vary the air flow produced by the blower so as to correspond to the air flow generated by a selected environment conditioning plant. A manometer is connected to the measurement duct and is operable to measure static pressure in the measurement duct when the measurement duct is in air flow communication with the duct system. Performance curves for the environment conditioning plants are used to convert static pressures to air flows.

20 Claims, 7 Drawing Sheets

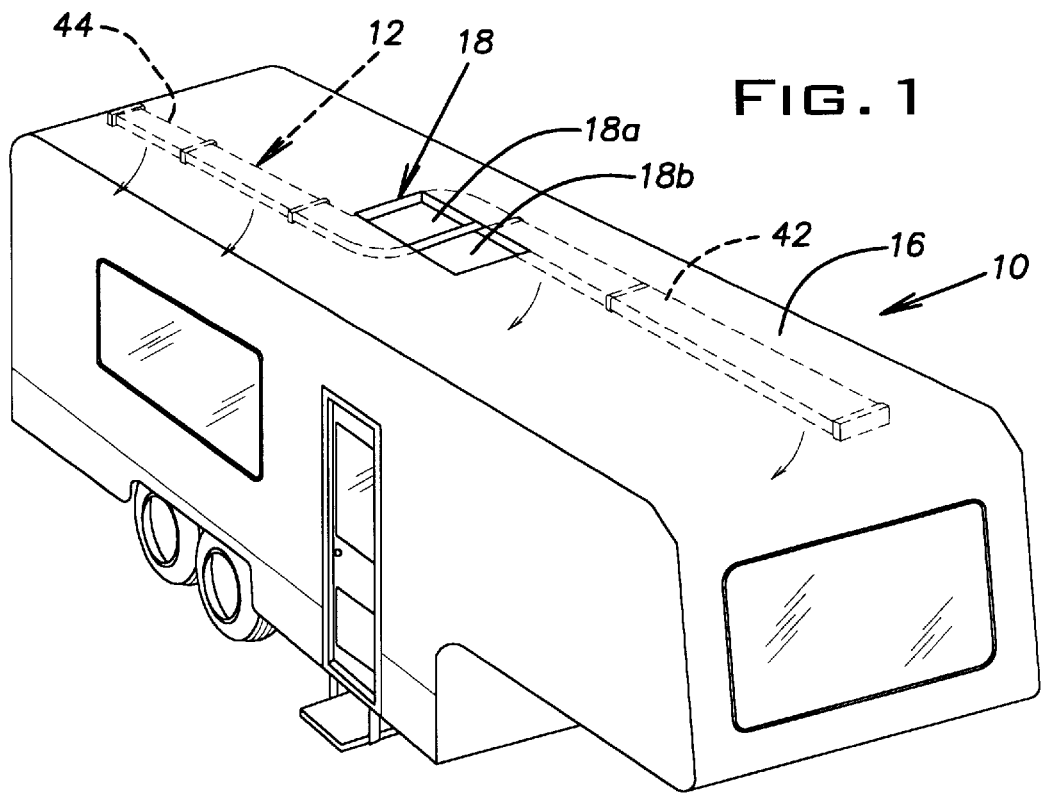
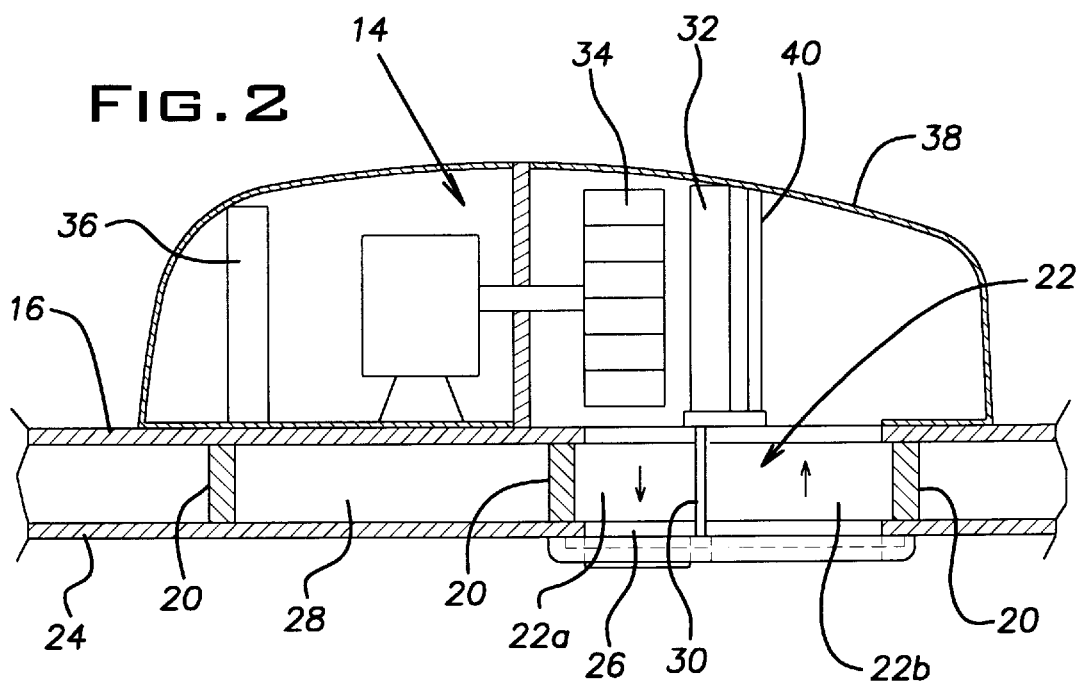

APPARATUS AND METHOD FOR MEASURING AIR FLOW FROM A DUCT SYSTEM

BACKGROUND OF THE INVENTION

This invention relates to devices for measuring air flow through duct systems and, more particularly, to a device for measuring the total static pressure of a duct system in order to measure the total volume of air flowing from the duct system for a particular type of environment conditioning plant.

A structure built for human occupation, such as a building, or a recreational vehicle is often provided with an environment conditioning system for heating and/or cooling the structure. A conventional environment conditioning system includes an environment conditioning plant, such as an air conditioner or a heat pump, and a duct system for delivering conditioned air from the plant to different areas or rooms within the structure.

When providing an environment conditioning system for a structure it is important to provide a desired flow of conditioned air into each of the various rooms or areas within the structure. Therefore, it is important to be able to measure the total volume of air flowing from the duct system for a particular type of plant. Often, the total volumetric air flow must be measured several times for different plants to ensure that an adequately-sized plant is provided.

Conventionally, the total volume of air flowing from a duct system is obtained by measuring the individual volumetric air flows from the various outlet vents of the duct system and then adding them together. Typically, the individual volumetric air flows are measured using a rotary vane anemometer, a hot wire-type anemometer, or a pitot tube anemometer. At each outlet vent, the velocity (in feet per minute) of the air is measured using the anemometer. The velocity is then multiplied by the cross-sectional area of the outlet vent to obtain the volumetric air flow from the outlet vent.

As can be appreciated from the foregoing, measuring the total volumetric air flow from a duct system for several different plants is a time consuming endeavor. The plants must installed and un-installed and a multitude of air flow measurements must be taken. Accordingly, there is a need in the art for a simpler apparatus and method for measuring the total volume of air flowing from a duct system for a particular type of plant. The present invention is directed to such an apparatus and method.

SUMMARY OF THE INVENTION

It therefore would be desirable, and is an advantage of the present invention, to provide a device for measuring air flow from a duct system. The device includes a housing having an inlet and an outlet. A restrictor is movably connected to the housing for movement between a plurality of restricting positions wherein the restrictor restricts differing portions of the inlet. A blower is disposed in the housing for moving air into the inlet and exhausting air from the housing through the outlet. A duct is provided having an inlet portion and an outlet portion. The inlet portion is connected to the outlet of the housing for air flow communication therewith. The outlet portion is adapted for air flow communication with an input opening of the duct system. A manometer is connected to the duct and is operable to measure static pressure in the duct when the outlet portion of the duct is in air flow communication with the input opening of the duct system, thereby providing a measure of air flow from the duct system.

Also provided in accordance with the present invention is a device for predicting the air flow from a duct system that would be produced by an environment conditioning plant. The device includes a duct having an inlet portion and an outlet portion. The outlet portion is adapted for air flow communication with an input opening of the duct system. A blower is connected to the inlet portion of the duct for air flow communication therewith. The blower is operable to provide an air flow to the duct. Means are provided for varying the air flow to correspond to the air flow generated by the environment conditioning plant. A manometer is connected to the duct and is operable to measure static pressure in the duct when the outlet portion of the duct is in air flow communication with the input opening of the duct system, thereby providing a predicted measure of air flow from the duct system that would be produced by the environment conditioning plant.

Also provided in accordance with the present invention is a method of predicting the air flow from a duct system that would be produced by an environment conditioning plant. In accordance with the method, a performance graph is provided which contains a performance curve for the environment conditioning plant, wherein static pressure is plotted versus air flow. A measurement duct is provided and disposed over an inlet of the duct system. An air flow corresponding to the air flow generated by the environment conditioning plant is generated and directed into the measurement duct for movement into the duct system. The static pressure in the measurement duct is measured to obtain a static pressure value. The static pressure value is then converted to an air flow value using the performance graph.

BRIEF DESCRIPTION OF THE DRAWINGS

The features, aspects, and advantages of the present invention will become better understood with regard to the following description, appended claims, and accompanying drawings where:

FIG. 1 shows a perspective view of a recreational vehicle having a duct system mounted between a ceiling and a roof;

FIG. 2 shows a side sectional view of an air conditioner disposed on the roof and connected to the duct system;

DETAILED DESCRIPTION OF THE PREFERRED EMBODIMENTS

Figure 3:
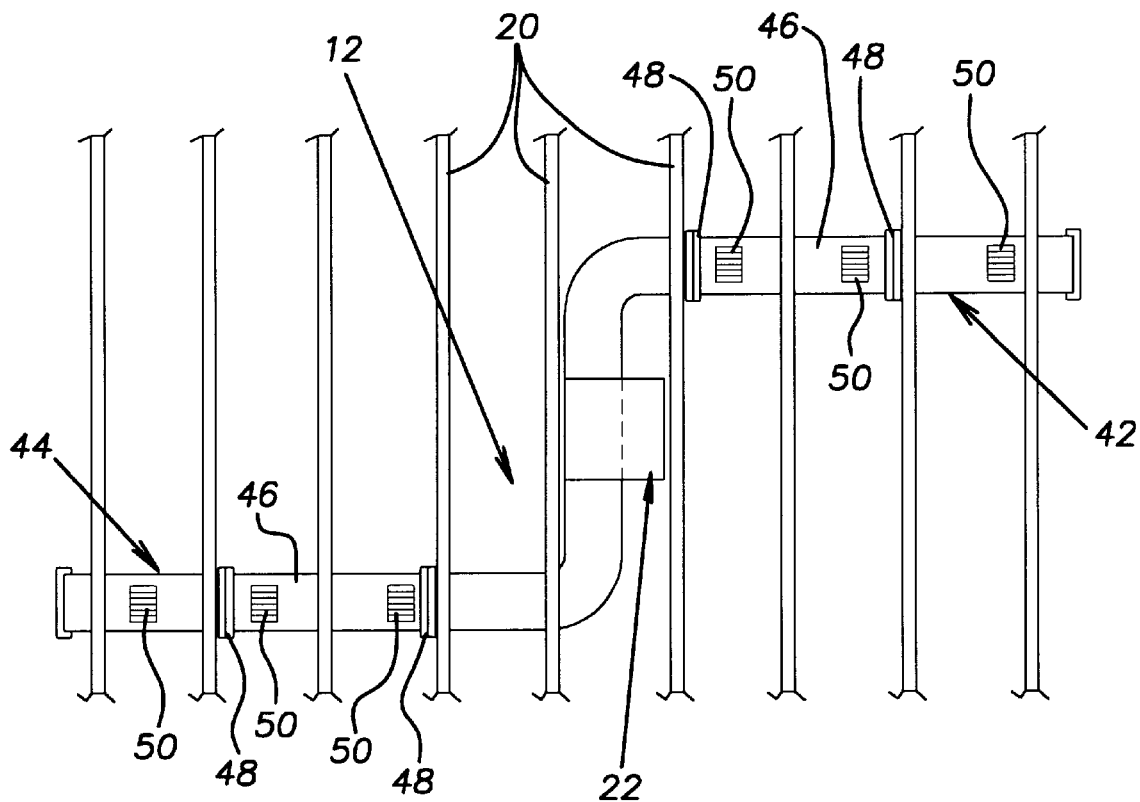
FIG. 3 shows an interior bottom view of a top portion of the recreational vehicle, with the ceiling removed to better show the duct system.

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1 there is shown a recreational vehicle 10 having a duct system 12 for distributing conditioned air from an environment conditioning plant, such as an air conditioner 14 (shown in FIG. 2). As used herein, the term "recreational vehicle" refers to mobile homes, motor homes, travel trailers, fifth wheelers, recreational vans, and the like.

Referring now also to FIG. 2, the air conditioner 14 is for mounting on a roof 16 of the recreational vehicle 10. The air conditioner 14 communicates with the duct system 12 through a roof opening 18 formed in the roof 16. The roof opening 18 is located between a pair of transversely-extending rafters 20 and may have a conventional square shape with 14×14 inch dimensions. A plenum box 22 is shown disposed below the roof opening 18, between the roof 16 and a ceiling 24 of the recreational vehicle 10. The plenum box 22 may extend through an opening 26 formed in the ceiling 24 and is preferably sealed to prevent communication with a cavity 28 between the roof 16 and the ceiling 24. A plate 30 is disposed in the plenum box 22 to divide the plenum box 22 into a discharge portion 22a and a return portion 22b. The plate 30 also divides the roof opening 18 into an inlet portion 18a and an outlet portion 18b.

Conventionally, the air conditioner 14 includes an evaporator 32, a blower 34, and a condenser 36. The air conditioner 14 is enclosed in a housing 38 for securement to the roof 16. The blower 34 draws air from the return portion 22b of the plenum box 22 through the outlet portion 18b of the roof opening 18 and into the housing 38. The air passes through a filter 40 and then the evaporator 32. The blower 34 then blows the conditioned air from the evaporator 32 through the inlet portion 18a of the roof opening 18 and into the discharge portion 22a of the plenum box 22. Thereafter, the conditioned air enters the duct system 12 for distribution throughout the recreational vehicle 10.

Referring now also to FIG. 3, the duct system 12 is shown connected to the plenum box 22 for air-flow communication therewith. The duct system 12 is provided to distribute cold conditioned air from the air conditioner 14 to various areas of the recreational vehicle 10. The various areas of the recreational vehicle 10 can be either separate rooms or zones of a single interior space of the recreational vehicle 10.

The duct system 12 includes a first duct 42 and a second duct 44. The first and second ducts 42, 44 are disposed in the cavity 28 between the roof 16 and the ceiling 24 and are in communication with the discharge portion 22a of the plenum box 22. The first duct 42 extends from one side of the discharge portion 22a of the plenum box 22, toward the front of the recreational vehicle 10. The second duct 44 extends from the other side of the discharge portion 22a of the plenum box 22, toward the rear of the recreational vehicle 10. Each of the first and second ducts 42, 44 is typically about 12–36 feet long.

The first and second ducts 42, 44 are typically comprised of a number of duct segments 46 secured together at joints 48. Each of the duct segments 46 is typically rectangular and has a cross section with a width of about 7 inches and a depth of about 1.25 inches to about 2.25 inches. The duct segments 46 are typically formed from galvanized sheet steel but could be manufactured from other materials. Preferably, the duct segments 46 and the joints 48 are sealed to prevent condensation from forming on adjacent surfaces during operation of the air conditioner 14.

The first and second ducts 42, 44 communicate with the various areas and/or rooms of the recreational vehicle 10 through registers 50 mounted in the ceiling 24. In a known manner, the first and second ducts 42, 44 may be designed so that a generally equal volume of cold conditioned air is delivered to each of the registers 50. In conjunction therewith, the air conditioner 14 was selected to deliver a total volumetric flow of cold conditioned air to the duct system 12 that is effective to provide adequate cooling to each area and/or room in the recreational vehicle 10. The total volumetric flow of cold conditioned air was determined using a measuring device 60 embodied in accordance with the present invention.

Figure 4:
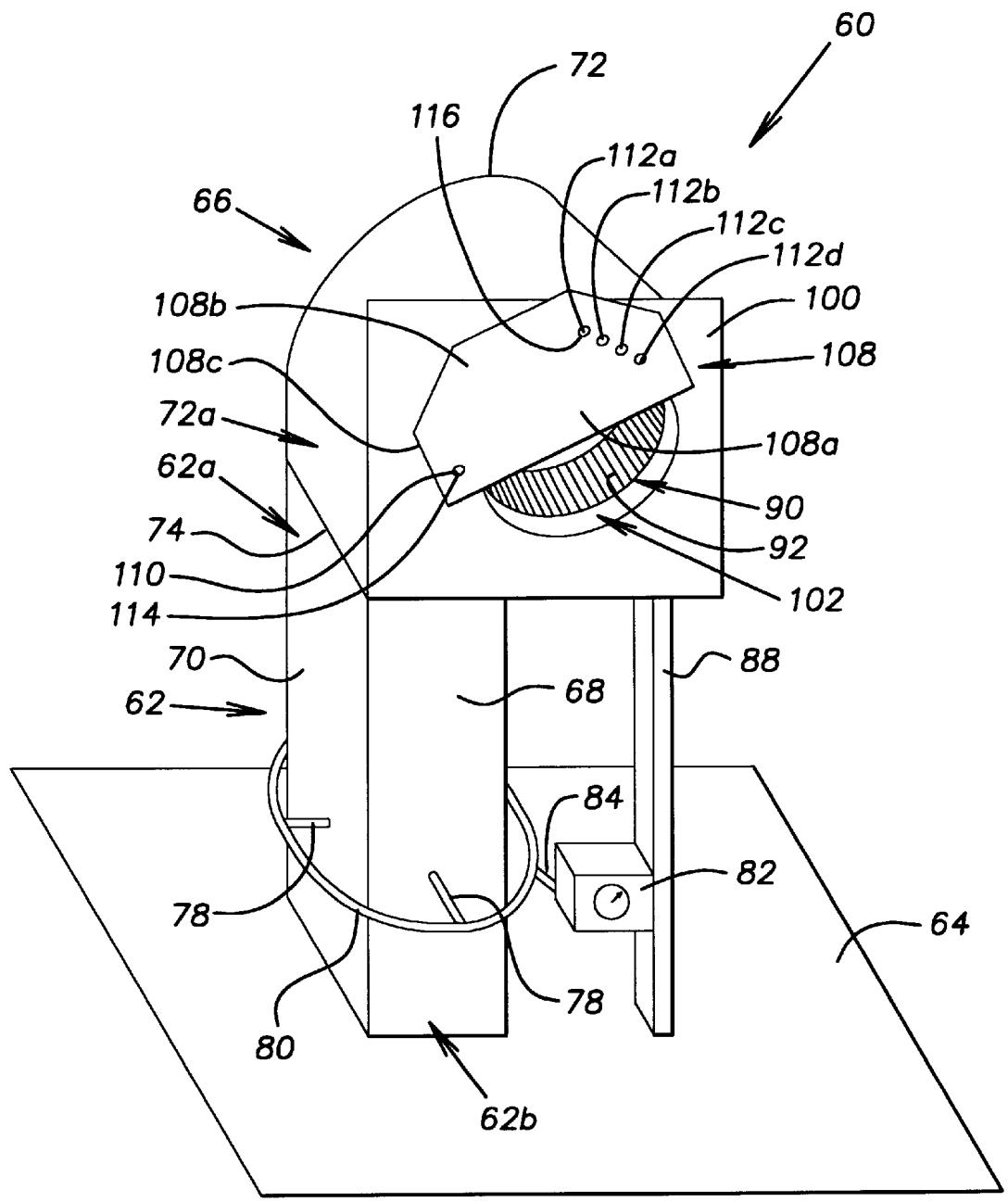
FIG. 4 shows a perspective view of a measurement device for measuring air flow from the duct system.

Referring now to FIG. 4, the measuring device 60 is used to selectively predict the air flows from the duct system 12 (hereinafter "duct air flows") that would be produced by different air conditioners and/or heat pumps. The measuring device 60 makes these predictions by selectively duplicating air flows generated by the air conditioners and/or heat pumps and measuring the static pressures produced thereby at an inlet to the duct system 12. The measuring device 60 generally includes a measurement duct 62, a mounting plate 64, and a blower assembly 66.

The measurement duct 62 includes a front panel 68, a back panel 69 (shown in FIG. 5), and a pair of side panels 70, which are joined together to provide the measurement duct 62 with a rectangular cross-section, preferably having a width of about 4 3/16 inches and a depth of about 4 3/4 inches. The measurement duct 62 is preferably about 12 1/2 inches long and is formed from galvanized sheet steel, but could be manufactured from other materials. The measurement duct 62 includes an inlet portion 62a and an outlet portion 62b. The inlet portion 62a is secured by screws, or other fastening means, to an outlet portion 72a of a blower housing 72 at a joint 74. Preferably, the joint 74 is sealed to prevent air from escaping the measuring device 60 as the air passes between the blower housing 72 and the measurement duct 62.

Figure 6:
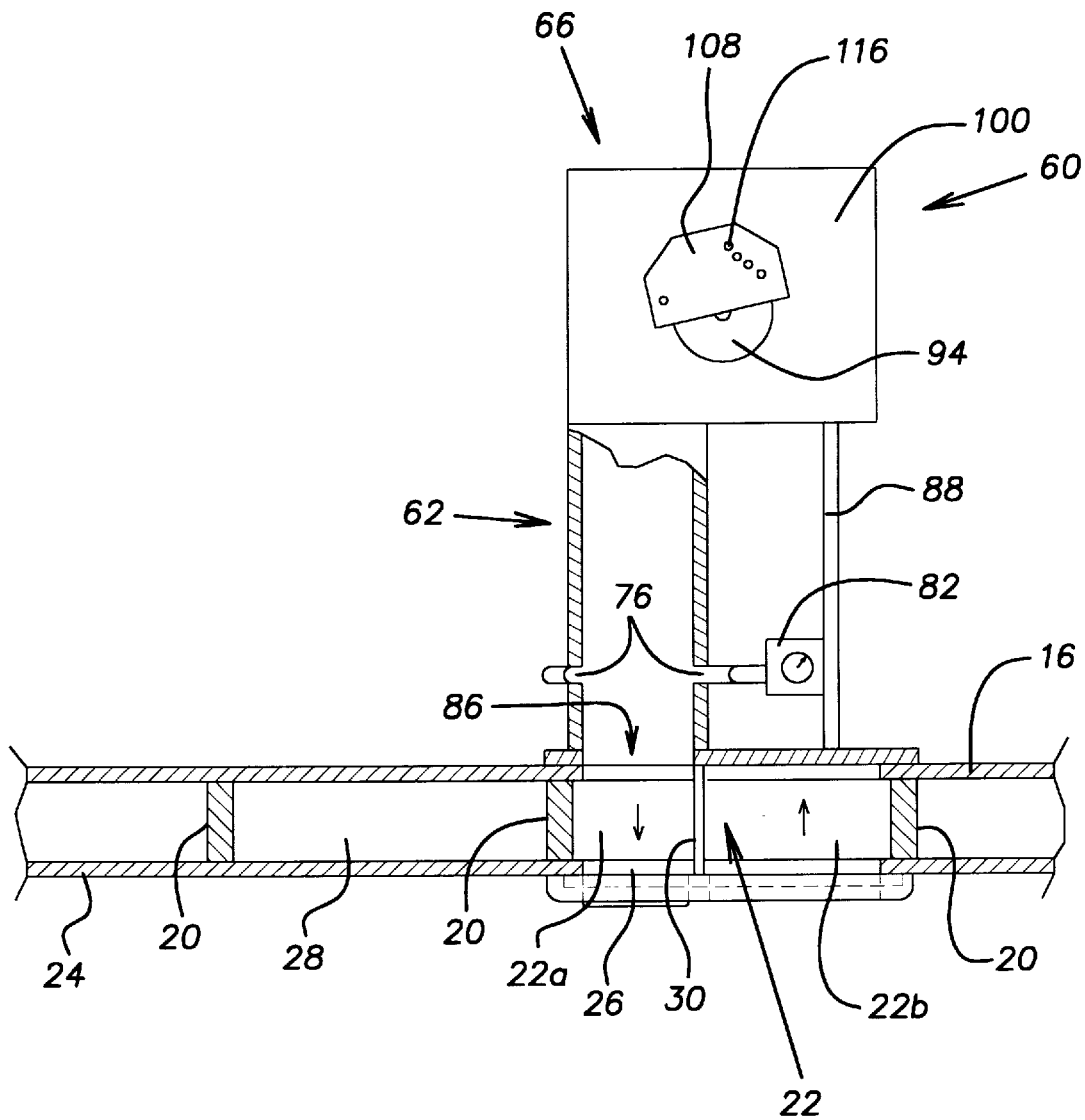
FIG. 6 shows a partially broken away side view of the measurement device disposed on the roof and connected to the duct system.

A plurality of apertures 76 (shown in FIG. 6) are formed in the measurement duct 62, one aperture 76 being formed substantially in the center of each of the front, back, and side panels 68, 69, 70. The apertures 76 are vertically aligned with each other and are preferably located about 4 1/8 inches above the outlet portion 62b of the measurement duct. Pipes 78 are disposed through the apertures 76 and are connected together by a tubular ring 80. A pressure intake of a manometer 82 is connected to the ring 80 by tubing 84. The manometer 82 may be of any conventional design that can accurately measure 0–1 inches water column ("WC). Such a manometer can be obtained from the Viatran Corporation of Grand Island, N.Y. As will be described more fully below, the manometer 82 measures static pressure in the measurement duct 62 when the measuring device 60 is mounted over the roof opening 18 (as shown in FIG. 6) and the blower assembly 66 is activated.

The blower housing 72 and the measurement duct 62 are supported on the mounting plate 64, which is substantially square and preferably has dimensions of about 15 inches×15 inches. The mounting plate 64 defines an opening 86 (shown in FIG. 6) around which the outlet portion 62b of the measurement duct 62 is secured. The measurement duct 62 is secured to the mounting plate 64 by screws, welding, or other fastening means. A support leg 88 is secured between the blower housing 72 and the mounting plate 64, and helps support the blower housing 72 on the mounting plate 64. When the opening 86 in the mounting plate 64 and the outlet portion 62b of the measurement duct 62 are aligned over the discharge portion 22a of the plenum box 22, the mounting plate 64 covers the remainder of the roof opening 18.

Figure 5:
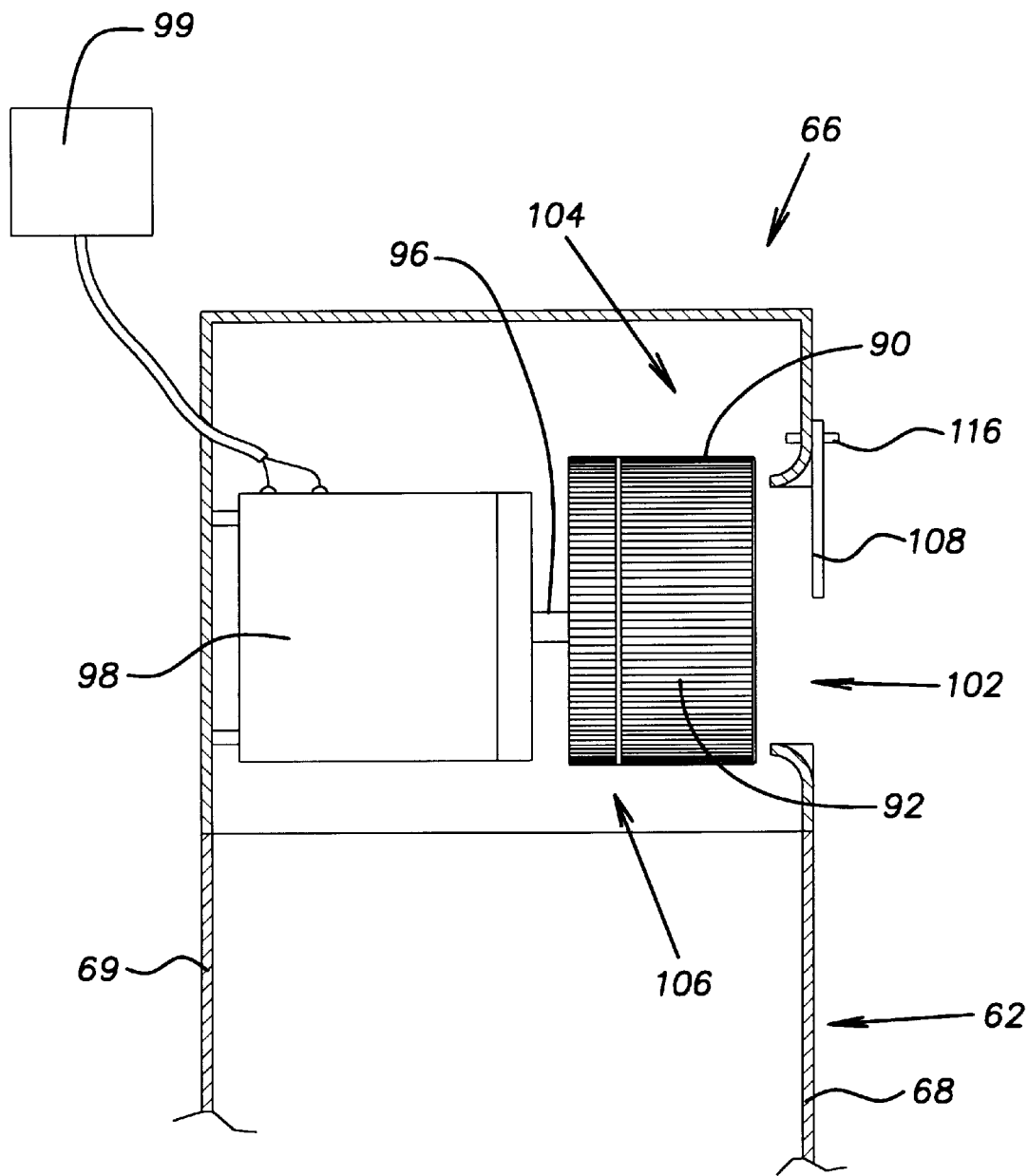
FIG. 5 shows a sectional view of a blower assembly of the measurement device.

Referring now to FIG. 5, the blower assembly 66 is preferably a conventional centrifugal blower having a fan wheel 90 fitted with blades 92. An end plate 94 (shown in FIG. 6) of the fan wheel 90 is secured to a shaft 96 of an electric motor 98. Preferably, the electric motor 98 is powered by a 115–120 VAC, 60 Hz electric power source (not shown) and generates ⅕ Hp. A controller 99 may be provided to vary the speed of the electric motor 98.

The blower housing 72 is provided to enclose the fan wheel 90. The blower housing 72 is formed from galvanized sheet steel, but could be manufactured from other materials. The blower housing 72 includes a front faceplate 100 with an inlet opening 102 formed therein. A mounting hole (not shown) is formed in the faceplate 100, on a first side of the inlet opening 102, approximately midway between the top and bottom of the inlet opening 102. A locking hole (not shown) is also formed in the faceplate 100, just above the top of the inlet opening 102.

Preferably, the inlet opening 102 has a diameter of about 6½ inches. The fan wheel 90 is aligned with the inlet opening 102 and is disposed just inward therefrom. The fan wheel 90 cooperates with the blower housing 72 to form an air flow passage 104 between an interior surface of the blower housing 72 and an outer periphery of the fan wheel 90. The air flow passage 104 extends to an outlet opening 106 in the outlet portion 72a of the blower housing 72. As set forth above, the outlet portion 72a of the blower housing 72 is secured to the inlet portion 62a of the measurement duct 62, thereby providing air flow communication between the air flow passage 104 of the blower housing 72 and the measurement duct 62. When the electric motor 98 is energized, the fan wheel 90 generates a volumetric flow of air at the outlet opening 106 of the blower housing 72, i.e., an output air flow.

A restrictor plate 108 is provided to vary the output air flow. The restrictor plate 108 varies the output air flow by covering or restricting differing portions of the inlet opening 102 of the blower housing 72. The restrictor plate 108 has a rectangular bottom portion 108a and a frustoconical top portion 108b. It should be appreciated, however, that the restrictor plate 108 can have different shapes without departing from the scope of the present invention. A mounting aperture 110 is formed in the bottom portion of the restrictor plate 108, toward a first edge 108c of the restrictor plate 108. A plurality of positioning apertures 112a, 112b, 112c, and 112d are formed in the restrictor plate 108. The positioning apertures 112a–d are disposed in a generally linear configuration and extend downwardly and outwardly from the top portion 108b of the restrictor plate 108 to the bottom portion 108a of the restrictor plate 108. In FIGS. 4 and 6, four positioning apertures 112a–d are shown. However, as will be discussed more fully below, a greater or lesser number of positioning apertures may be formed in the restrictor plate 108 without departing from the scope of the present invention.

The restrictor plate 108 is movably mounted to the blower housing 72 so as to be movable between a plurality of restricting positions wherein the restrictor plate 108 covers differing portions of the inlet opening 102. The restrictor plate 108 is pivotably secured to the faceplate 100 by a mounting pin 114, which extends through the mounting aperture 110 in the restrictor plate 108 and is received in the mounting hole of the faceplate 100. In this manner, the restrictor plate 108 may be pivoted about the mounting pin 114 so as to move between the restricting positions. Each restricting position corresponds to an alignment of one of the positioning apertures 112a–d with the locking hole in the faceplate 108. The restrictor plate 108 is locked in a selected restricting position by inserting a locking pin 116 through the respective one of the positioning apertures 112a–d and into the locking hole.

It should be appreciated that the restrictor plate 108 can be movably mounted to the blower housing 72 by different mounting means without departing from the scope of the present invention. For example, the restrictor plate 108 can be slidably mounted over the faceplate 100 using tracks secured to the faceplate 100. Similarly, the restrictor plate 108 can be locked in a selected one of the restricting positions by different locking means without departing from the scope of the present invention. For example, the restrictor plate 108 can be secured in a selected restricting position using a toothed wheel secured to the restrictor plate 108 at the pivot point and an engaging pawl secured to the faceplate 100.

In a first restricting position, the restricting aperture 112d is aligned with the locking hole, whereas in a fourth restricting position, the restricting aperture 112a is aligned with the locking hole. When the restrictor plate 108 is in the first position, the restrictor plate 108 covers the smallest portion of the inlet opening 102 and, thus produces the greatest output air flow from the blower assembly 66. When the restrictor plate 108 is in the fourth restricting position, the restrictor plate 108 covers the greatest portion of the inlet opening 102 and, thus, produces the smallest output air flow from the blower assembly 66. In this manner, the restrictor plate 108 decreases the output air flow as the restrictor plate 108 is pivoted clockwise from the first restricting position to the fourth restricting position.

The restricting positions are selected to produce output air flows that match the output air flows of different makes and models of commercial air conditioners and/or heat pumps. This matching of output air flows is preferably performed in a wind tunnel (not shown), where air flows can be accurately measured. In the embodiment shown and described herein, the output air flows of the air conditioner 14, a heat pump (not shown), and two air conditioners (not shown) were measured in cubic feet per minute (CFM). The restricting positions of the restrictor plate 108 were then selected so as to produce these output air flows. As a result, the four restricting positions 112a–d were selected, respectively corresponding to the output air flow of the air conditioner 14, the heat pump, and the air conditioners. If it is desired to measure duct air flows for additional air conditioners and/or heat pumps, additional restricting positions can be selected.

It should be appreciated that in lieu of using the restrictor plate 108 to vary the output air flow, the speed of the electrical motor 98 may be increased and/or decreased using the controller 99 to vary the output air flow, as is known in the art. If this technique is used, the speeds of the electrical motor 98 are selected to produce output air flows that match the output air flows of different makes and models of commercial air conditioners and/or heat pumps.

Figure 7:
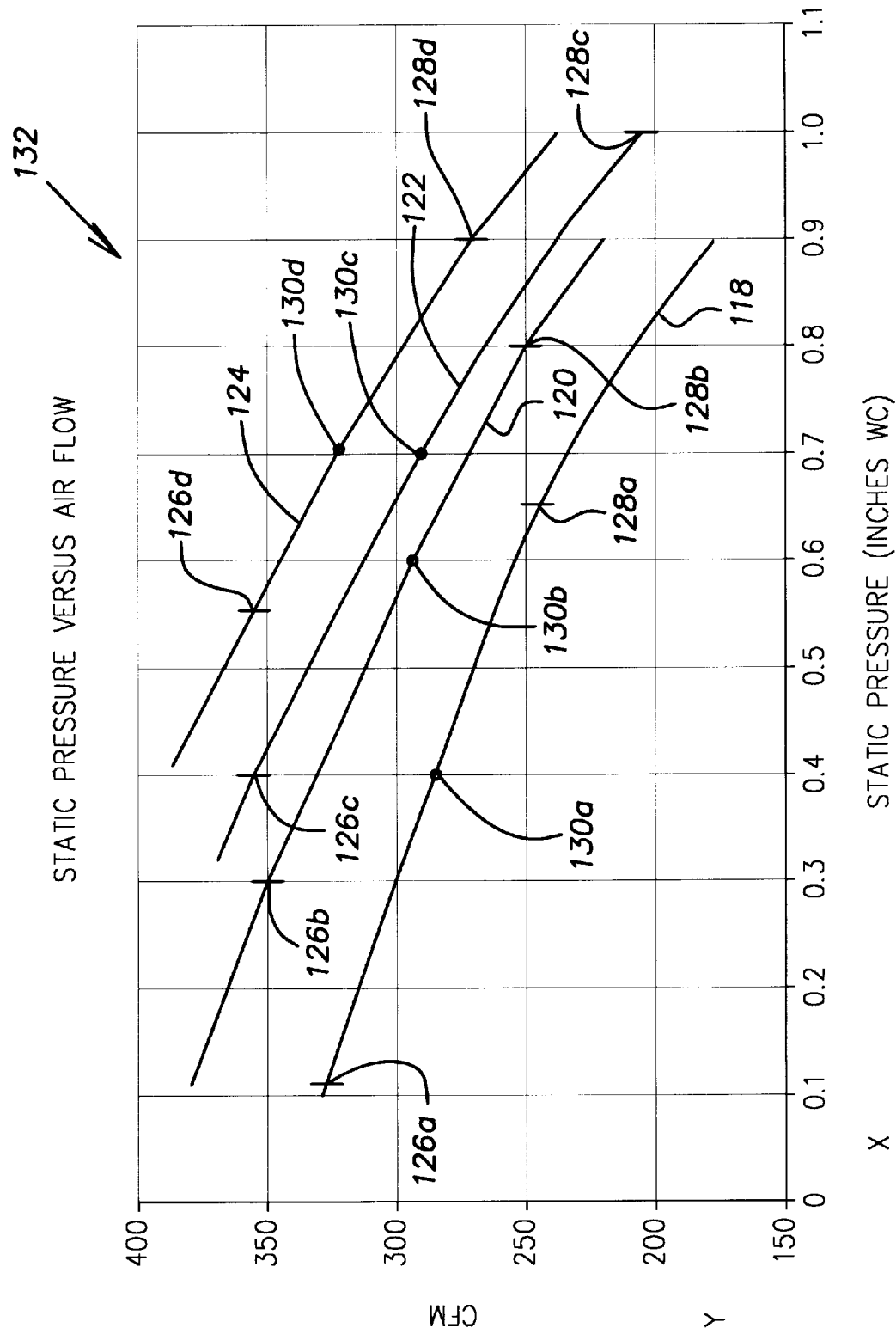
FIG. 7 shows a graph containing performance curves for environment conditioning plants, wherein static pressure is plotted versus air flow.

Referring now to FIG. 7, in addition to measuring the output air flows of the air conditioner 14, the heat pump, and the two air conditioners for selecting the restricting positions, performance curves 118, 120, 122, 124 for the air conditioner 14, the heat pump, and the two air conditioners are respectively developed to convert static pressures measured by the manometer 82 to duct air flows. The performance curves 118, 120, 122, and 124 for the air conditioner 14, the heat pump, and the two air conditioners are developed from data gathered in the wind tunnel. For each of the air conditioner 14, the heat pump, and the two air conditioners, a plurality of static pressures are formed in the wind tunnel. These static pressures include: maximum static pressures 126a,b,c,d for each of the air conditioner 14, the heat pump, and the two air conditioners, respectively; minimum static pressures 128a,b,c,d for each of the air conditioner 14, the heat pump, and the air conditioners, respectively; and optimum static pressures 130a,b,c,d for each of the air conditioner 14, the heat pump, and the air conditioners, respectively. The maximum static pressures 126a–d, and the minimum static pressures 128a–d define the respective operating limits for the air conditioner 14, the heat pump, and the air conditioners.

The air flow in CFM for each of the static pressures is then measured. The static pressures versus the air flows for each of the air conditioner 14, the heat pump, and the air conditioners are then plotted on a first graph 132, thereby yielding the performance curves 118, 120, 122, and 124. The first graph 132 may be fixed on any tangible medium, including paper medium and electronic medium.

Figure 8:
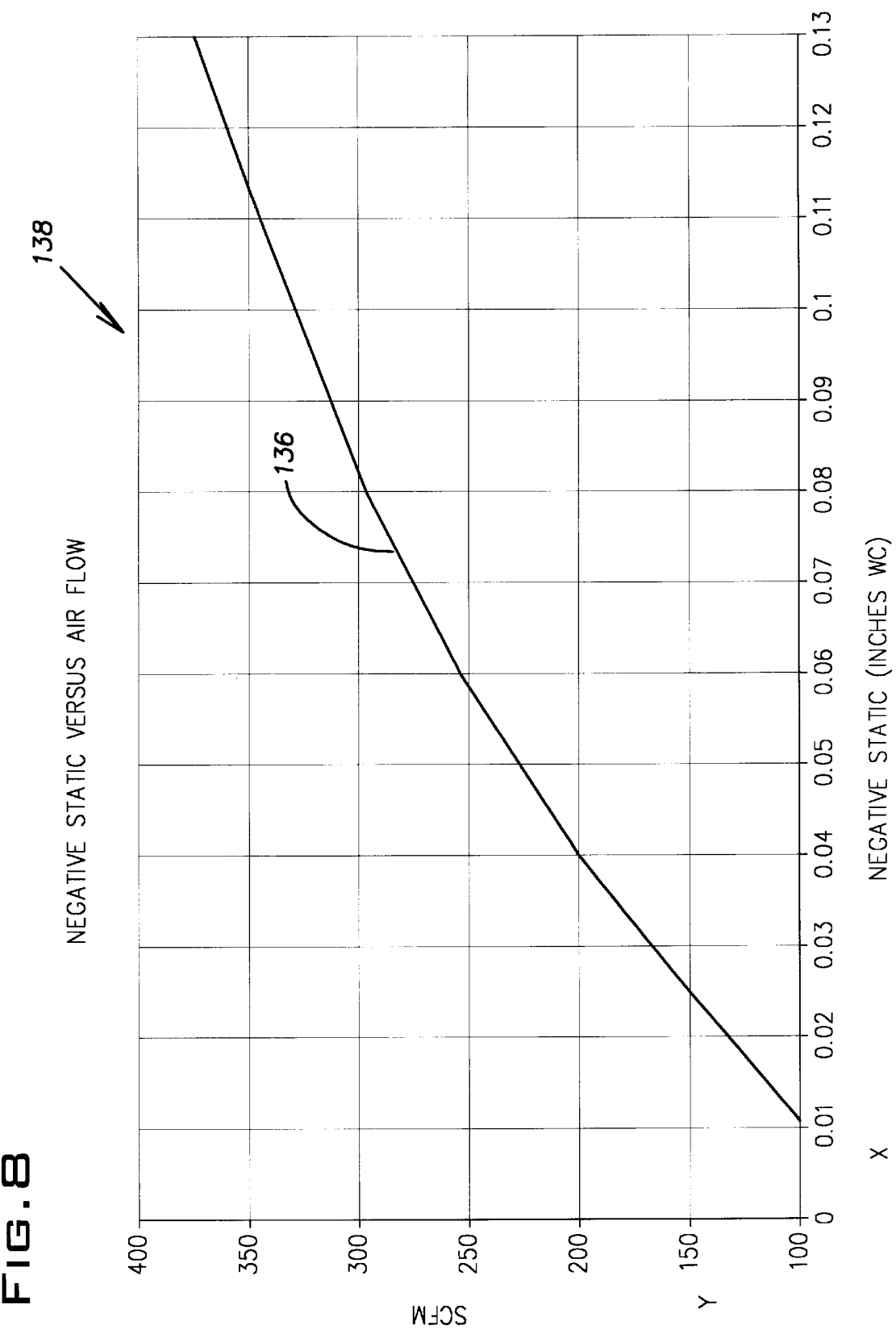
FIG. 8 shows a graph containing a compensation curve for a filter for the environment conditioning plants, wherein air flow is plotted versus pressure drop across the filter.

Referring now to FIG. 8, in order to compensate for a pressure drop that will be created by the filter 40, a compensation curve 136 is also developed from data gathered in the wind tunnel. A plurality of different air flows are formed in the wind tunnel and are directed through the filter 40. The pressure drop across the filter 40 (in the form of negative static pressures) is then measured for each of the air flows. The negative static pressures versus the air flows are then plotted on a second graph 138, thereby yielding the compensation curve 136. The second graph 138 may be fixed on any tangible medium, including paper medium and electronic medium.

Referring back to FIG. 6, the operation of the measuring device 60 will now be described with regard to predicting the duct air flow produced by the air conditioner 14. The measuring device 60 was first positioned on top of the roof 16 such that the opening 86 in the mounting plate 64 was aligned over the discharge portion 22a of the plenum box 22. The periphery of the mounting plate 64 was secured to the roof 16 by tape so as form a seal therebetween.

The restrictor plate 108 was moved to align the positioning aperture 112a with the locking hole, thereby placing the restrictor plate 108 in the fourth restricting position, as is shown in FIG. 6. The locking pin 116 was then inserted in the positioning aperture 112a and the locking hole, thereby locking the restrictor plate 108 in the fourth restricting position. The blower assembly 66 was activated to generate an air flow that passed through the measurement duct 62 and into the discharge portion 22a of the plenum box 22. The manometer 82 was then read to obtain a static pressure value.

Using the first graph 132 in FIG. 7, the static pressure value was found on the performance curve 126 for the air conditioner 14 and was followed over to the y-axis to obtain a corresponding air flow value. Using the second graph 138 in FIG. 8, the air flow value was found on the compensation curve 136 and was followed over to the x-axis to obtain a negative static pressure value. The negative static pressure value was then added to the static pressure value to obtain a total static pressure value. Using the first graph 132 again, the total static pressure value was found on the performance curve 126 for the air conditioner 14 and was followed over to the y-axis to obtain a corresponding duct air flow value.

The duct air flow value obtained above was used to determine that the air conditioner 14 had sufficient capacity to supply the necessary volumetric flow of cold conditioned air to the duct system 12 required to effectively cool each area and/or room in the recreational vehicle 10. If the air conditioner 14 would not have had sufficient capacity, the measuring device 60 could have been used to predict the duct air flows that would have been produced by the other two air conditioners, which have larger capacities.

Although the preferred embodiment of this invention has been shown and described, it should be understood that various modifications and rearrangements of the parts may be resorted to without departing from the scope of the invention as disclosed and claimed herein.

What is claimed is:

1. A device for predicting air flow from a duct system being produced by an environment conditioning plant, said device comprising:
    a housing having an inlet and an outlet;
    a restrictor movably connected to the housing for movement between a plurality of restricting positions wherein the restrictor restricts differing portions of the inlet;
    a blower disposed in the housing for moving air into the inlet and exhausting air from the housing through the outlet;
    a duct having an inlet portion and an outlet portion, said inlet portion being connected to the outlet of the housing for air flow communication therewith, and said outlet portion being adapted for air flow communication with an input opening of the duct system;
    a manometer connected to the duct and being operable to measure a static pressure value in the duct when the outlet portion of the duct is in air flow communication with the input opening of the duct system; and
    means for converting the measured static pressure value to an air flow value based on a performance curve of the environment conditioning plant; and
    wherein the restrictor is disposed in a selected one of the restricting positions, said selected one of the restricting positions produces an air flow that matches an output air flow of the environment conditioning plant.

2. The device of claim 1, further comprising a mounting plate upon which the duct and the housing are mounted.

3. The device of claim 2, wherein the mounting plate defines an opening through which the outlet portion of the duct may communicate with the input opening of the duct system.

4. The device of claim 3, wherein the outlet portion of the duct is secured to the mounting plate around the opening in the mounting plate.

5. The device of claim 3, wherein the mounting plate is sized to cover an output opening of the duct system located proximate to the input opening of the duct system.

6. The device of claim 2, further comprising a support leg secured between the housing and the mounting plate.

7. The device of claim 1, wherein the blower is a centrifugal blower.

8. The device of claim 1, wherein the restricting positions other than the selected one of the restricting positions are selected to cause air flows that match output air flows of other environment conditioning plants.

9. The device of claim 1, further comprising means for locking the restrictor in a selected one of the restricting positions.

10. The device of claim 9, wherein the locking means comprises:
    a locking hole formed in the blower housing;
    a plurality of apertures formed in the restrictor, said apertures being positioned for respective alignment with the locking hole to place the restrictor in the respective restricting positions, whereby when a selected one of the apertures is aligned with the locking hole, the restrictor is in the selected one of the restricting positions; and a locking pin for insertion through the selected one of the apertures and the locking hole.

11. A device for predicting the air flow from a duct system that is produced by an environment conditioning plant, said device comprising:

a duct having an inlet portion and an outlet portion, said outlet portion being adapted for air flow communication with an input opening of the duct system;

a blower connected to the inlet portion of the duct for air flow communication therewith, said blower being operable to provide an air flow to the duct;

means for varying the air flow to correspond to the air flow generated by the environment conditioning plant;

a manometer connected to the duct and being operable to measure a static pressure value in the duct when the outlet portion of the duct is in air flow communication with the input opening of the duct system; and means for converting the measured static pressure value to an air flow value based on a performance curve of the environment conditioning plant.

12. The device of claim 11, further comprising a housing enclosing the blower, said housing having an inlet.

13. The device of claim 12, wherein the means of varying the air flow comprises a restrictor movably connected to the housing for movement between a plurality of restricting positions wherein the restrictor restricts differing portions of the inlet.

14. The device of claim 13, wherein a locking hole is formed in the blower housing; and wherein a plurality of apertures are formed in the restrictor, said apertures being positioned for respective alignment with the locking hole to place the restrictor in the respective restricting positions, whereby when a selected one of the apertures is aligned with the locking hole, the restrictor is in a selected one of the restricting positions.

15. The device of claim 14, further comprising a locking pin for insertion through the selected one of the apertures and the locking hole.

16. The device of claim 11, wherein the blower comprises an electric motor connected to a fan wheel.

17. A method of predicting the air flow from a duct system that is produced by an environment conditioning plant mounted over an inlet of the duct system, said method comprising the steps of:

providing a performance graph containing a performance curve for the environment conditioning plant, wherein static pressure is plotted versus air flow;

providing a measurement duct;

disposing the duct over the inlet of the duct system when the environment conditioning plant is not mounted over the inlet of the duct system;

generating an air flow corresponding to the air flow generated by the environment conditioning plant;

directing the air flow into the measurement duct for movement into the duct system;

measuring static pressure in the measurement duct to obtain a static pressure value; and converting the static pressure value to an air flow value using the performance graph.

18. The method of claim 17, wherein the performance graph contains performance curves for other environment conditioning plants.

19. The method of claim 17, further comprising the steps of:

providing a compensation graph containing a compensation curve for a filter for the environment conditioning plant, wherein air flow is plotted versus pressure drop across the filter; and determining a pressure drop value from the air flow value using the compensation graph;

adding the pressure drop value to the static pressure value to obtain a total static pressure value; and converting the total static pressure value to a duct air flow value using the performance graph.

20. The method of claim 17, wherein the duct system is in a recreation vehicle, said recreational vehicle having a roof through which the inlet of the duct system extends.

* * * * *